United States Patent Office 3,428,525
Patented Feb. 18, 1969

3,428,525
PRODUCTION OF O-CARBAMYL-D-SERINE
Edward B. Hodge, Terre Haute, Ind., assignor to Commercial Solvents Corporation, a corporation of Maryland
No Drawing. Filed May 28, 1964, Ser. No. 371,129
U.S. Cl. 195—80      5 Claims
Int. Cl. C12k 1/00

ABSTRACT OF THE DISCLOSURE

A process for producing O-carbamyl-D-serine is disclosed. The process includes cultivating the product in an aqueous nutrient containing *Streptomyces orchidaceous*, adjusting the pH of the medium to about 2 to 5, absorbing cycloserine in a cation exchange resin, adjusting the effluent pH to about 4 to 6.5, concentrating and then cooling the effluent to crystallize the O-carbamyl-D-serine and separating the crystals out.

---

This invention relates to O-carbamyl-D-serine and more particularly it relates to a process for recovering O-carbamyl-D-serine from its admixture with cycloserine in an aqueous solution.

O-carbamyl-D-serine has the general formula

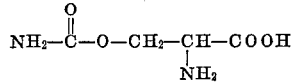

and has proved to be therapeutically effective in animals and humans.

The antibiotic cycloserine is a broad spectrum antibacterial agent possessing activity against both gram-negative and gram-positive bacteria including mycobacteria and has been found to be particularly effective in the treatment of tuberculosis and urinary tract infections in man. Cycloserine is produced by cultivating a species of microorganism which has been designated *Streptomyces orchidaceous* in aqueous nutrient media.

It has now been surprisingly found that O-carbamyl-D-serine can be easily separated from its admixture with cycloserine in an aqueous solution. Such a solution can be a fermentation beer produced by cultivation of the microorganism *Streptomyces orchidaceous*.

Cycloserine is recovered from aqueous solutions, e.g. the nutrient media in which it is produced, i.e. cycloserine beers, by adsorption of the antibiotic from the aqueous solution on a cation exchange resin in the sodium form and elution of the antibiotic from the cation exchange with a dilute base, such as sodium hydroxide, thereby effecting a considerable concentration of the antibiotic in an aqueous solution. Free cycloserine can be produced by the formation of an intermediate water insoluble metal salt of cycloserine and decomposition of the metal salt with precipitation of the metal ion as an insoluble salt to liberate cycloserine which goes into solution as free cycloserine. The cycloserine can be recovered by freeze drying or by crystallization, for instance, by adding to the solution a water-miscible solvent in which cycloserine is insoluble.

In general, O-carbamyl-D-serine is recovered from the effluent remaining after absorption of the cycloserine on the cation exchange resin by evaporation of the effluent followed by crystallization. This crude O-carbamyl-D-serine may then be recrystallized to give pure O-carbamyl-D-serine.

In carrying out my invention it is preferred to first remove all impurities possible from the cycloserine beer so as to minimize contamination in later purification steps. Thus, in recovering cycloserine and O-carbamyl-D-serine from cycloserine beers, i.e. fermentation medium, one can first adjust the pH of the beer from about 2.0 to 5.0 with any suitable acid, e.g. mineral acid, such as hydrochloric acid, sulfuric acid, phosphoric acid and the like. The cycloserine is removed from the aqueous solution by adsorption on a cation exchange resin, e.g. an aldehyde-polyhydric phenol resin wherein the activity is due to the presence of sulfonic acid groups. Such ion exchange agents are commonly known as "Amberlite IR–120," "Permutit Q," or "Dowex 50." The cycloserine beer may be mixed with char and filtered prior to acidification, if desired, to clear the beer.

The effluent remaining after the adsorption of the cycloserine is then treated to recover O-carbamyl-D-serine. Recovery of O-carbamyl-D-serine is effected, for example, by evaporation of the effluent to concentrate the beer effluent, for instance to ½₀ to ⅓₀ of the initial volume, preferably under reduced pressure, e.g., 10 to 100 mm. Hg, followed by crystallization at low temperature, e.g. 5° C. to room temperature, for a period of time sufficient to allow crystallization of the O-carbamyl-D-serine. It can be further purified, e.g. by recrystallization in water. The effluent may be filtered prior to concentration if desired. Control of the temperautre during crystallization is not critical, the temperature being merely correlated with time for efficiency.

Care must be taken in recovering the O-carbamyl-D-serine, however, to control the pH of the effluent since the compound will hydrolyze in strong acid solutions and at high pH will form a salt which will not crystallize out. Generally, the pH of the effluent should be from about pH 4 to 6.5, preferably about 5.

The following example serves to further illustrate the invention.

EXAMPLE

Cycloserine beer (1000 mls.) prepared by cultivation of the organism *Streptomyces orchidaceous* was stirred with 10 gms. of char for 10 minutes, and then filtered with the aid of diatomaceous earth. The filtrate (800 mls.) was passed at about 10 mls. per minute down a column of ion exchange resin "Amberlite IR–120" (Na+) of about 24 x ⅝ inches containing about 100 mls. of resin. The pH of the beer was adjusted with HCl to 2.8 before being passed through the column. Subsequent elution of the column with 1% sodium hydroxide solution led to recovery of about 90% of the cycloserine present, showing that it had been adsorbed by the resin.

The pH of the effluent was adjusted with HCl to a pH of 5. Evaporation of the effluent from the column under reduced pressure to 25 ml., followed by overnight crystallization in a refrigerator at a temperature of 5 to 10° C. led to the recovery of 1.43 gm. of crude O-carbamyl-D-serine. This crude product was recrystallized from 25 ml. of water to give 0.36 gm. of pure O-carbamyl-D-serine, M.P. 202–204° C.

It is claimed:
1. A process for the production of O-carbamyl-D-serine comprising cultivating the organism *Streptomyces orchidaceous* in an aqueous nutrient cultivation medium, adjusting the pH of the medium to from about 2 to 5, passing the medium through a cation exchange resin to adsorb cycloserine, concentrating the effluent remaining after said adsorption, cooling said concentrated effluent at a temperature and for a time sufficient to crystallize O-carbamyl-D-serine from said effluent, and separating said O-carbamyl-D-serine.

2. The process of claim 1 wherein said separated O-carbamyl-D-serine is purified by recrystallization from water.

3. The process of claim 1 wherein said concentration comprises distillation of the effluent under reduced pressure.

4. A process for the recovery of O-carbamyl-D-serine in admixture with cycloserine in an aqueous solution comprising adjusting the pH of the solution to from about 2 to 5, adsorbing the cycloserine on a cation exchange resin, concentrating the effluent remaining following said adsorption, cooling said concentrated effluent to a temperature and for a period of time sufficient to crystallize O-carbamyl-D-serine, and separating said O-carbamyl-D-serine.

5. The process of claim 4 wherein the effluent is adjusted to a pH from about 4 to 6.5.

References Cited

UNITED STATES PATENTS

| | | | |
|---|---|---|---|
| 2,773,878 | 12/1956 | Shull et al. | 195—80 X |
| 2,938,836 | 5/1960 | Hagemann et al. | 195—80 |
| 3,090,730 | 5/1963 | Harned | 195—80 |

OTHER REFERENCES

Fanaka et al.: "J. Gen. Appl. Microbiology," vol. 9, No. 4, pp. 409–414, December 1963.

MAURICE W. GREENSTEIN, *Primary Examiner.*

U.S. Cl. X.R.

260—307, 482